United States Patent Office 3,563,063
Patented Feb. 16, 1971

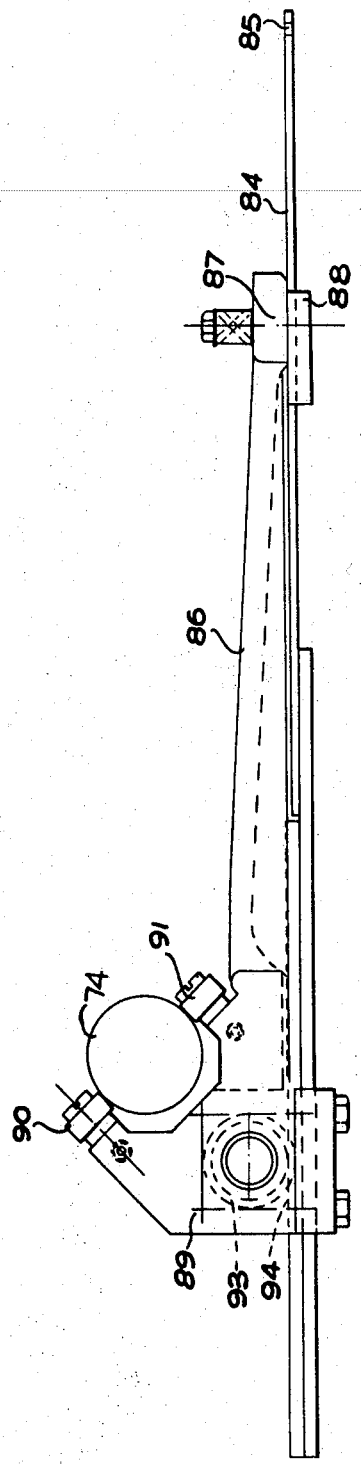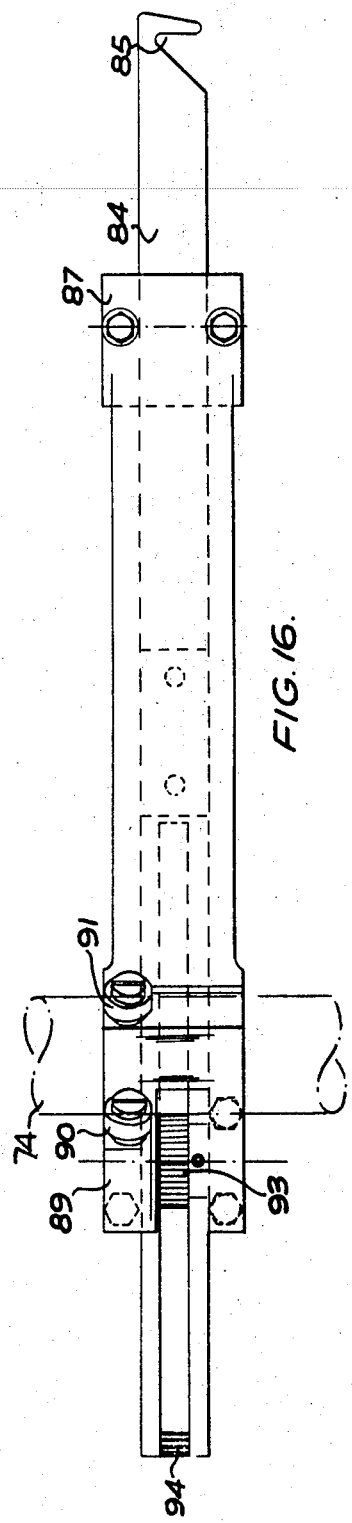

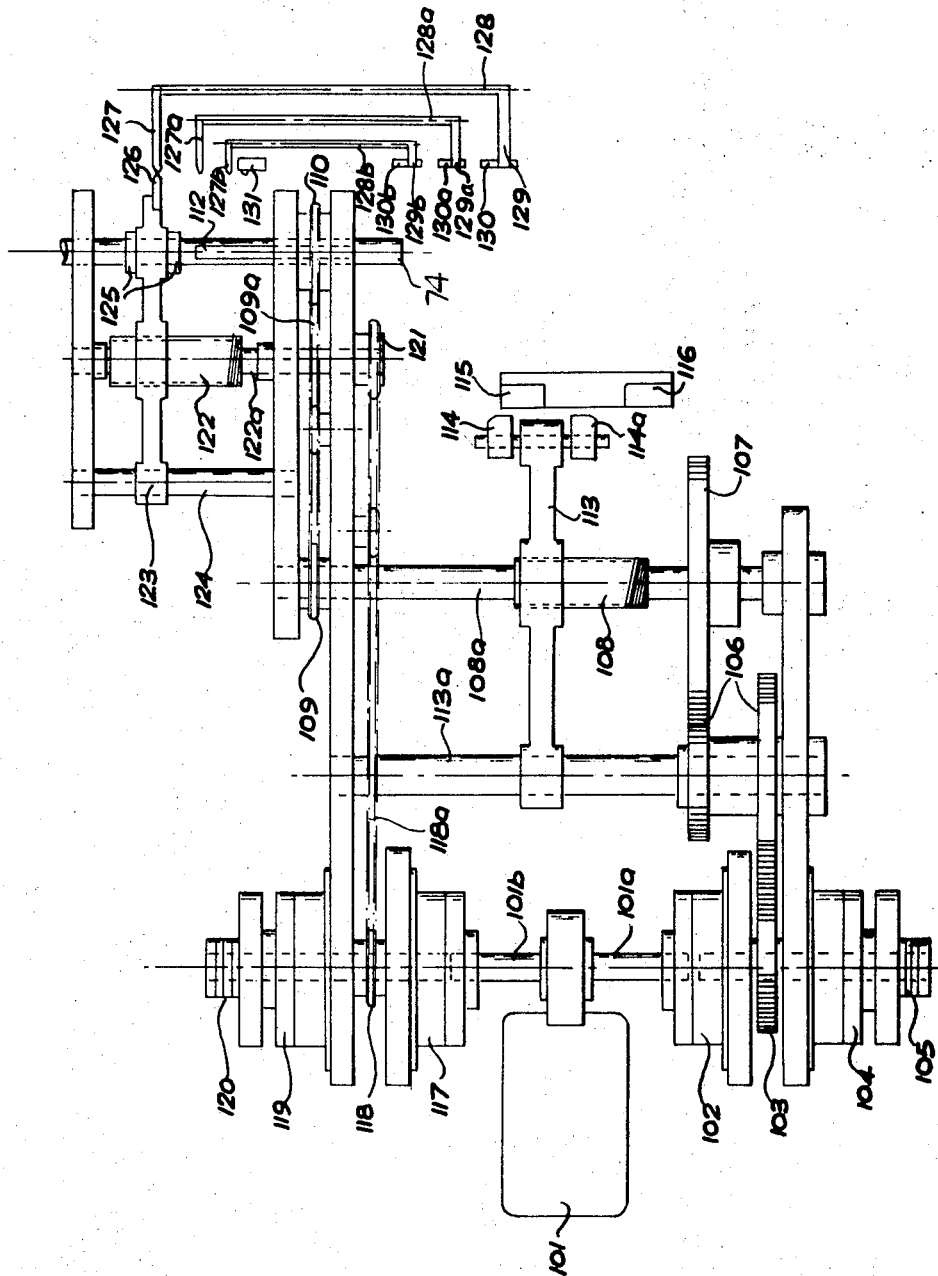

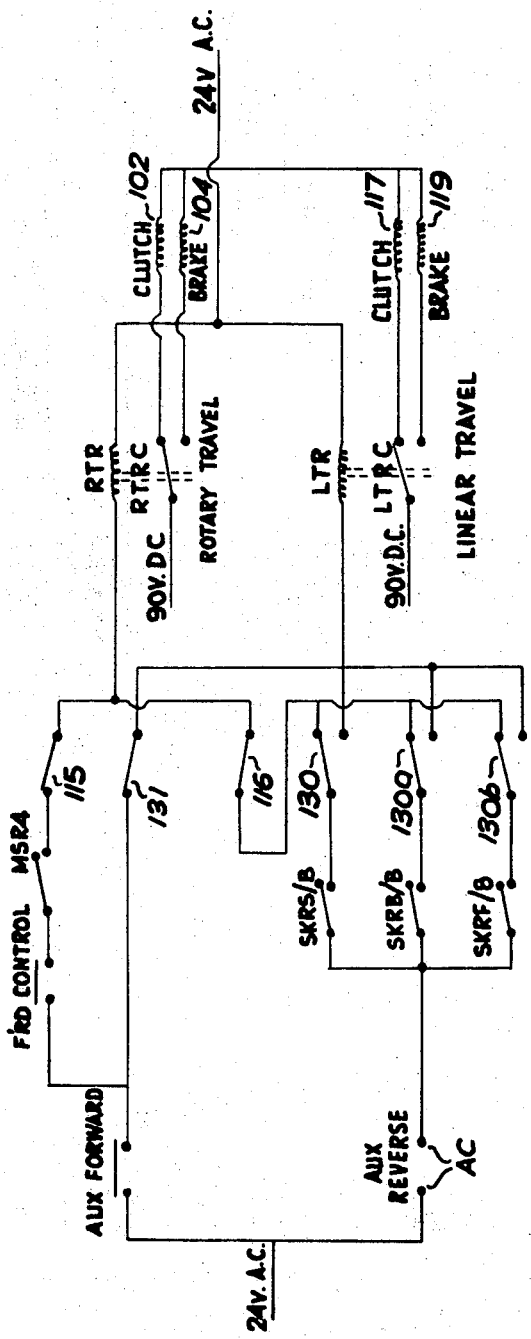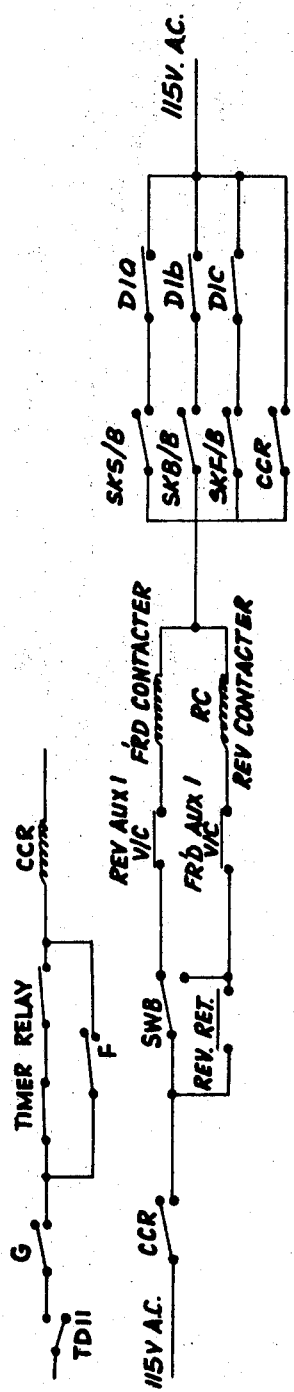
FIG. 18

3,563,063
STRAIGHT BAR KNITTING MACHINES
Raymond Blood, Shepshed, and Peter LeGood and Alan John Pearson, Loughborough, England, assignors to William Cotton Limited
Filed Aug. 26, 1968, Ser. No. 755,316
Claims priority, application Great Britain, Sept. 1, 1967, 39,997/67
Int. Cl. D04b 9/40
U.S. Cl. 66—148
12 Claims

ABSTRACT OF THE DISCLOSURE

A straight bar knitting machine for making pressed off ribs or turned welts having fabric draw-off mechanism, means for transferring rib loops from machine to frame needles, fabric transfer mechanism comprising lift and pusher arms operated from a transfer point bar to receive the ribs or welts from the needles and for delivering the ribs or welts to an upper location, with cutter and trapper mechanism for trailing yarn, and wherein there is in each division a magazine point bar unit under operational control of cams on an upper cam shaft driven through a revolution clutch from the machine's machine cam shaft, each unit having a removable magazine point bar and transfer elements which are cam controlled for transferring each of a plurality of ribs or welts, elevated by the transfer point bar mechanism, from the transfer point bars to the magazine point bars, including a cam operated tray-like fabric guide for the ribs or welts, switch control means for independent motor control of the transfer point bar mechanism, and a graduated control cam for the magazine point bar unit to deal with ribs or welts of different lengths.

CROSS REFERENCES TO RELATED APPLICATIONS

Reference is made to British patent application No. 39,997/67 of Sept. 1, 1967, William Cotton Limited, from which priority is claimed.

This invention is for improvements in or relating to straight bar knitting machines adapted for producing knitted welts and primarily to straight bar rib knitting machines adapted for producing rib welts.

The conventional method of producing rib welts on these machines, i.e. by knitting them in continuous fabric form with waste courses, slack courses and a draw thread between them, requires that manual time and labour be involved in the process of separating the rib welts ready for applying to another machine for body fabrics to be knitted onto them.

However the invention is concerned with the kind of machine proposed by our U.S. Pat. No. 3,401,539, in which a draw off hook bar is operated by cam operated mechanism to draw off the welts; upon the last course of each welt being knitted, a transfer point bar is operated by a cam operated mechanism to take off the welt from the needles; the selvedge yarn is cut and trapped by cam operated cutter and trapper mechanism and the welt is raised by the cam operation of the transfer point bar to an elevated location, so that the welts are produced in separate form to avoid the manual time and labour of the conventional process.

In the event of the welts being rib welts produced on a rib machine, means are provided for transferring the machine needle loops of the last course of each rib welt to the frame needles to facilitate the transfer of the welt to the transfer point bars.

There is also disclosed in our U.S. Pat. No. 3,401,539 an elevated conveyor by which empty transfer point bars at an end of a multi-section machine can be carried to the knitting sections where the point bars are removably received and controlled by a pusher and lift arm mechanism to receive the welts individually from the needles, and to be returned to the conveyor which carries the removable loaded transfer point bars back to the end of the machine for substituting by empty transfer point bars and so on.

Although the conveyor arrangement has obvious advantages, it has been found that its rate of handling the transfer point bars cannot be at such a high rate required to cope satisfactorily with the high output of welt production, particularly in the instance of short length welts.

An object of the invention is to provide a machine of the kind referred to of such improved construction that the welts can be handled in satisfactory manner to cope with the high rate of welt production.

The invention provides a straight bar knitting machine of the kind referred to in which is provided an elevated magazine point bar unit having a magazine point bar, the arrangement being such that each time a welt is produced it is raised by the transfer point bar mechanism to the elevated magazine point bar unit which, for each of a plurality of the welts thus elevated in turn, is operated to transfer, by use of transfer elements, a welt to the magazine points, and the magazine point bar being removably mounted so as to be removable when loaded with a plurality of the welts and replaced by an empty magazine point bar. Conveniently in a multi-section machine there is a magazine point bar unit in each knitting section, and cam operated mechanism interconnects all the units for simultaneous operation. Conveniently also each unit has a single revolution cycle under control of a revolution clutch which is timed to operate cyclically from a revolution pattern control device. Each unit conveniently embodies a tray-like fabric guide device constructed and arranged for operation, each time the unit operates, to guide the welts on the magazine point bar clear of the transfer points during the latters' subsequent movements.

Conveniently there are switch control means provided for the machine to be non-running for at least one period while the transfer point bar mechanism is raised by an independent motor control, and the extent of raising during this period is predetermined, according to the length of the welt, under control of a motor control switch and a graduated control cam which is operated from the fabric draw off shaft.

Conveniently also, cam operated means for the draw off hook bar provides for its advance into co-operation with the knocking over bits so that in the latters' upward movements they release the welt from the hook bars.

The transfer point bar mechanism conveniently has an extra lift motion by the independent motor control for a second period to raise the welts clear of the draw-off hooks during the latter's retraction.

The cutter and trapper mechanism conveniently comprises relatively stationary and movable arms which incline upwardly to the needles, and motor operated means including clutches and brakes for operating the cutter and trapper mechanism first to move the relatively stationary and movable arms inwardly of the selvedge by a shaft and then outwardly towards the selvedge to search for the yarn, the shaft is rotated for advancing and retracting the movable arm, and adjustable switch control indicator means are provided for influencing the cutter and trapper mechanism to operate at different positions for welts of different widths.

Conveniently the machine needle bar is operated with an auxiliary retracting motion on two occasions, one to provide space for the welts to be transferred from the needles to the transfer point bar and for the latter to raise the welts, and another to provide space for the trapper and cutter arms to be advanced to the knocking over bits.

In the instance of the welts being rib welts the machine needle loops of the last course of each welt are transferred to the frame needles as hereinbefore referred to prior to transfer of the welts to the transfer point bars.

The above and other features of the invention set out in the appended claims are incorporated in the arrangements, which will be hereinafter particularly described as specific embodiments with reference to the accompanying drawings in which:

FIG. 15 is a detail side view of part of yarn cutter and trapper mechanism.

FIG. 16 is a plan view of FIG. 15.

FIG. 17 is a view of control means for the latter mechanism.

FIGS. 18 and 19 are electrical control circuits for the machine.

Figure 1:
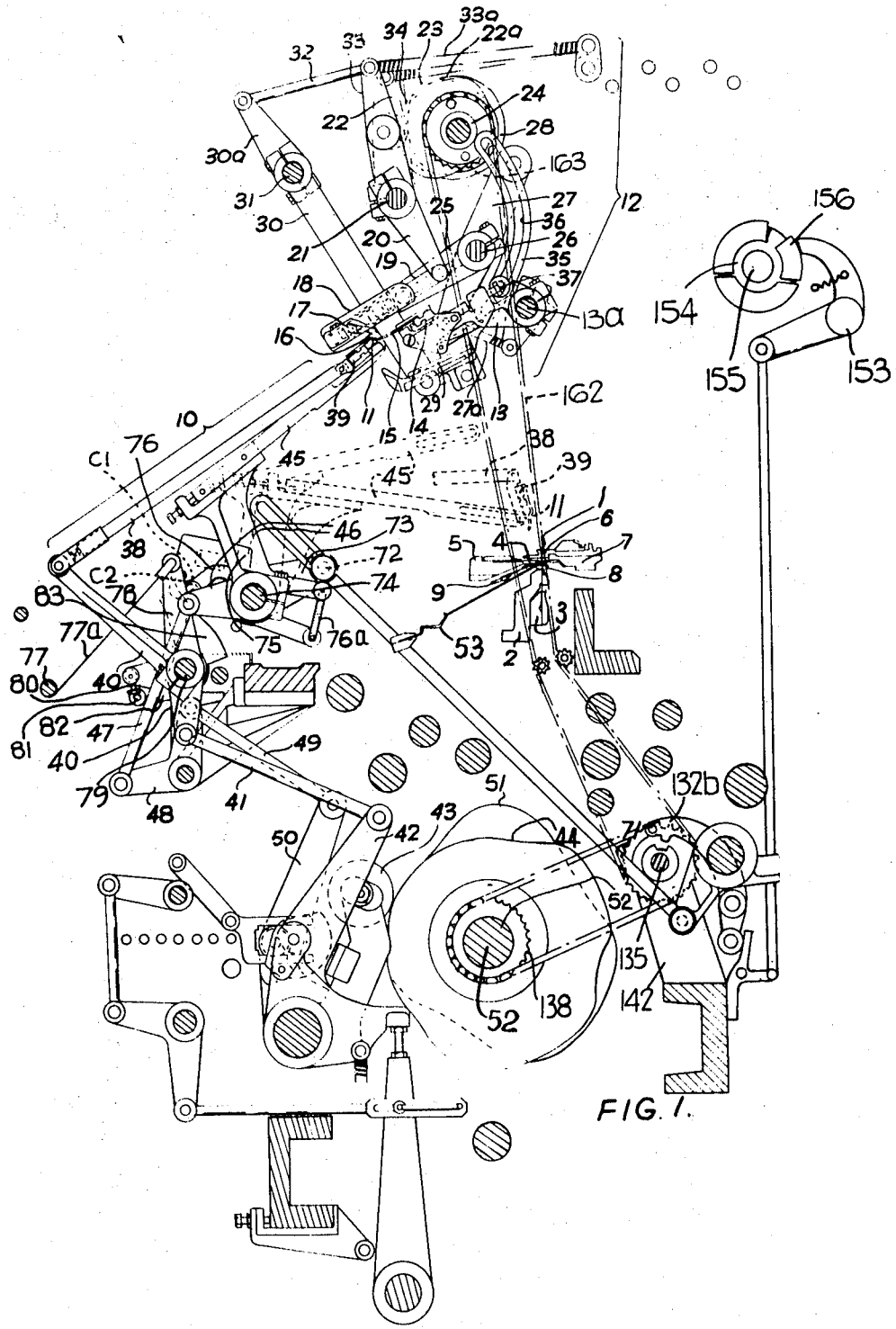
FIG. 1 is a cross sectional view of part of a multisection straight bar rib knitting machine according to the invention.

Referring to FIG. 1 the straight bar rib knitting machine is of the type having vertical frame needles 1 divided and carried in known manner by split needle bars 2, 3 and operated for knitting by known cam operated means, machine needles 4 carried by a machine needle bar 5 and operated by known cam operating means to co-operate with the frame needles 1 in the production of rib welts. There is also shown the usual sinkers 6 carried by the sinker bar 7, knocking over bits 8, and machine slide means 9, these sinkers, knocking over bits, and the machine slide, being operated in known manner by known cam operated mechanism.

The machine is provided, in each knitting section, with fabric transfer point bar mechanism indicated generally at 10 and hereinafter more particularly described.

This transfer point bar mechanism 10, operates, also in a manner to be hereinafter particularly described, to take off by their transfer points 11, rib welts from the needles at the end of their production respectively, and to raise the rib welts to different locations indicated by full and broken lines and particularly to the elevated location in which the points 11 are shown in full lines.

For cooperation with the transfer points 11 at the elevated location there is provided, in each knitting section, a magazine point bar unit indicated generally at 12.

Figure 2:
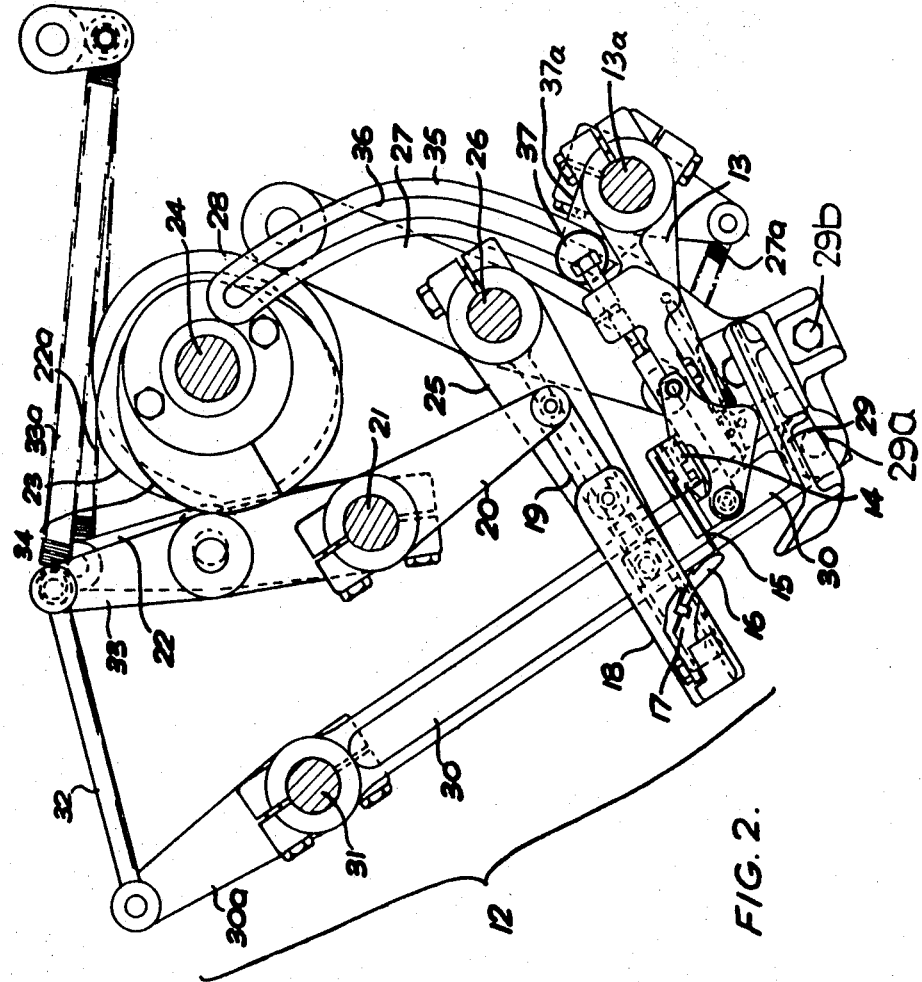
FIG. 2 is an enlarged end view of a magazine point bar unit in each knitting section of the machine.
Figure 3:
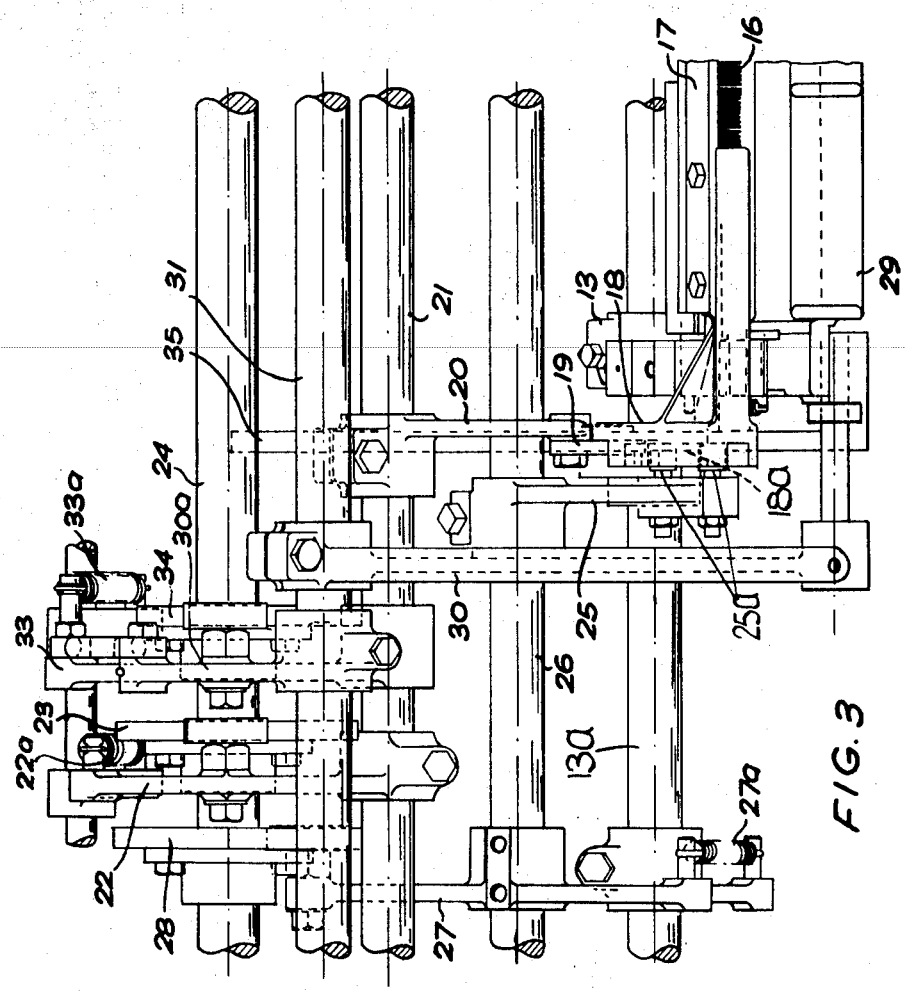
FIG. 3 is a front view of one end part of the magazine point bar mechanism.

In each unit there are spaced brackets such as 13 held stationary on a mounting rod 13a, see also FIGS. 2 and 3, to which is removably fitted a magazine point bar 14 having magazine points 15. For cooperating with the points 15, there are knocking over bits 16 carried by a knocking over bar 17 which is mounted on spaced arms such as 18. These arms such as 18 are longitudinally displaceable through the medium of spaced links such as 19 which are pivotally connected to spaced arms such as 20 secured to a shaft 21 to which is also secured a cam follower arm 22 operable, under control of a spring 22a by a cam 23 on a cam shaft 24.

The spaced arms such as 18 are carried by arms such as 25 fixed on a shaft 26 to which is also secured a cam follower lever 27 operable, under control of a spring 27a, by a cam 28 on the cam shaft 24. The arms such as 18 are slidably mounted by having recesses such as 18a, FIG. 3, in which engage rollers such as 25a on the arms such as 25.

There is further provided a fabric control tray-like member 29 which has connected to it, pivotally by pivots such as 29a FIG. 2, spaced levers such as 30 secured to a shaft 31 on which is an arm 30a connected by a link 32 to a cam follower lever 33 operable, under control of a spring 33a, by a cam 34 on the cam shaft 24. The fabric guide control tray-like member 29 has pivotally attached to it, by pivots such as 29b, FIG. 2, spaced arcuate guide arms such as 35 which has a slot 36 through which extends a peg 37 held stationary by arms such as 37a on the mounting rod 13a. Operation of each of these magazine point bar units is as follows with reference to FIGS. 4 to 9. At the time that the transfer points 11 are raised to the elevated location of FIGS. 1 and 4, they box with the magazine points 15, FIG. 4, the knocking over bits 16 are disposed in a standing position projecting between the points at a location above a rib welt RW on the transfer points 11, as shown, and the fabric guide member 29 is in an upper position shown to the right of the rib welt RW and substantially parallel to the points 11.

Figure 5:
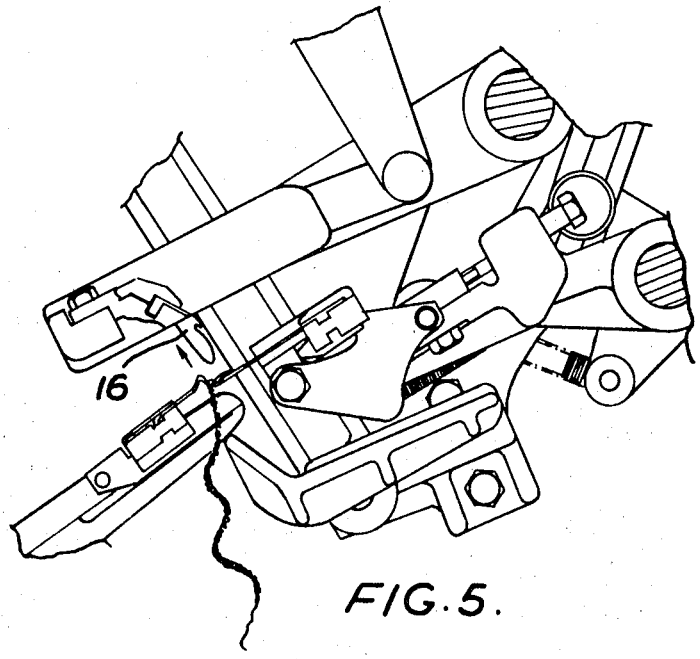
FIG. 5 is a similar view to FIG. 4 showing the knocking over bits retracting.

The first operation of the unit is for the cam 28 to operate the cam follower 27 whereby the arms such as 25 are pivotally displaced upwardly thereby to retract the knocking over bits 16 away from the points, as shown in FIG. 5.

Figure 6:
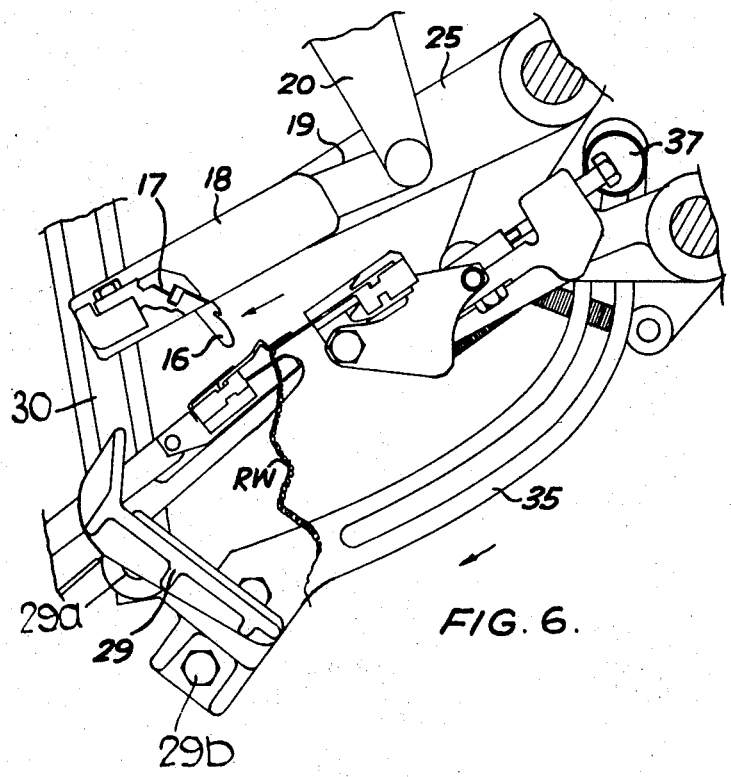
FIG. 6 is a similar view to FIG. 5 showing the knocking over bits moving downwardly and a fabric control tray moving upwardly.

The next step is for the cam 23 to operate the cam follower lever 22 for the arms such as 20, FIG. 6 and links such as 19 to displace the arms such as 18 along the arms such as 25 thereby to move the knocking over bits 16 in inclined direction downwardly and to the left, as shown. At the same time the cam 34 operates to operate the cam follower lever 33 which through the link 32 and cam follower lever 30 pulls the fabric guide member 29 downwardly and to the left of the rib welt RW, the fabric guide bar 29 meanwhile becoming inclined to a position substantially parallel with the rib welt RW, by guiding control of the slotted arm 35 riding along the peg 37.

Figure 7:
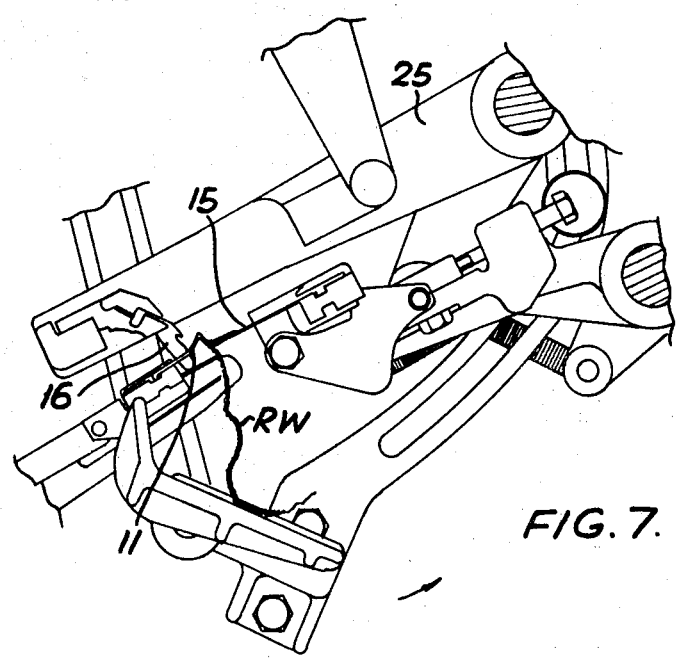
FIG. 7 is a similar view to FIG. 6 showing the knocking over bits advancing behind the rib welt.

The next step is for the cam 28 to operate the cam follower lever 27 to return the arms such as 25, FIG. 7, downwardly whereby the knocking over bits 16 are re-advanced to between the points 11, but this time at a location at the underside and to the left the rib welt RW.

Figure 8:
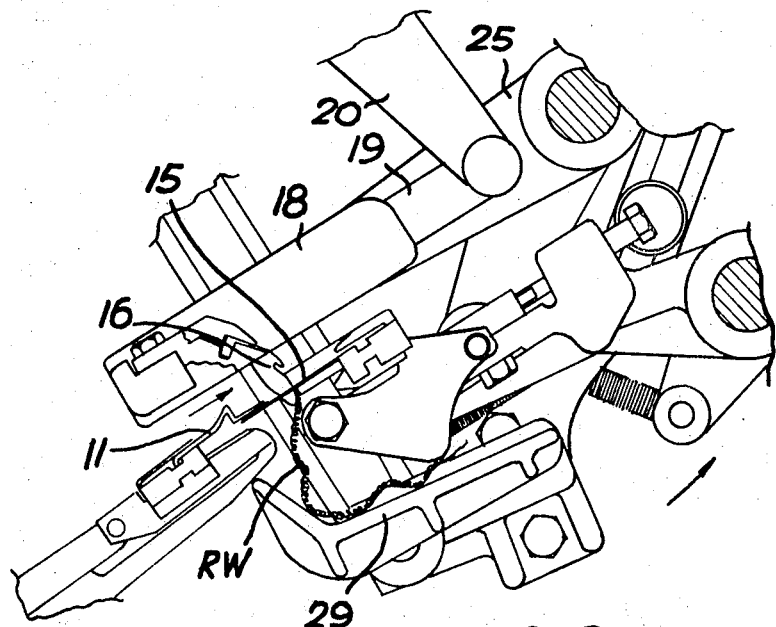
FIG. 8 is a similar view to FIG. 7 showing the knocking over bits moving upwardly to move the rib welt on to the magazine points.

The next step is for the cam 23 to operate the cam follower lever 22 which through the arms such as 20, FIG. 8, displaces the arms such as 18 whereby the knocking over bits 16 are returned upwardly and to the right, and in this motion they transfer the rib welt RW from the transfer points 11 to the magazine points 15. During this operation the cam 34 operates on the cam follower lever 33 which through the link 32 and the lever 30 returns the fabric guide member 29 to its original position substantially parallel to the points 11. In this position of the fabric guide member 29 it holds the rib welt RW in doubled up formation so as to be clear of the transfer points 11 when these points subsequently lower to the needles.

Figure 4:
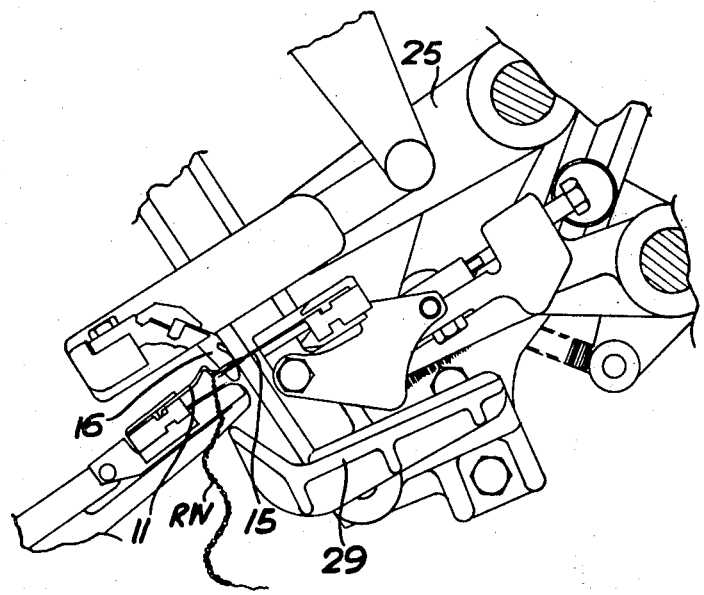
FIG. 4 is a scrap view of part of FIG. 2 showing knocking over bits of the mechanism in standing position and transfer points carrying a rib welt and boxing with magazine points of the mechanism.
Figure 9:
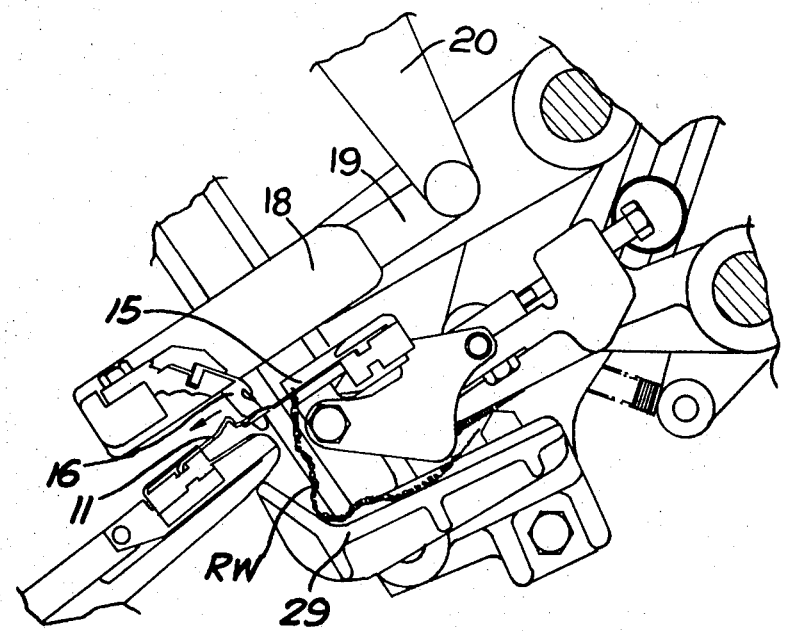
FIG. 9 is a similar view to FIG. 8 showing the knocking over bits moving downwardly back to the standing position.

The next step is for the cam 23 to operate the cam follower lever 22 which through the arms such as 20, FIG. 9, displaces the arm 18 whereby the knocking over bits 16 return downwardly and to the left of their original standing position of FIG. 4 ready for repeat operation.

This cycle of operations takes place for every welt produced in every knitting section under control of control means to be hereinafter described, with the result that the same magazine point bars in each knitting section have eventually transferred to them a plurality of the rib welts all of which are guide controlled by the fabric guide member such as 29 in each knitting section. Since this is the case, there is no wasted time in the production of rib welts by the machine, even though the rib welts may be of short length, and at the time when a sufficient number of rib welts have been transferred to the magazine point bar in each knitting section, it only remains for an operator to remove the loaded point bars and to replace them with empty point bars for repeat operation, again without any loss of time in production of the rib welts.

Figure 20:
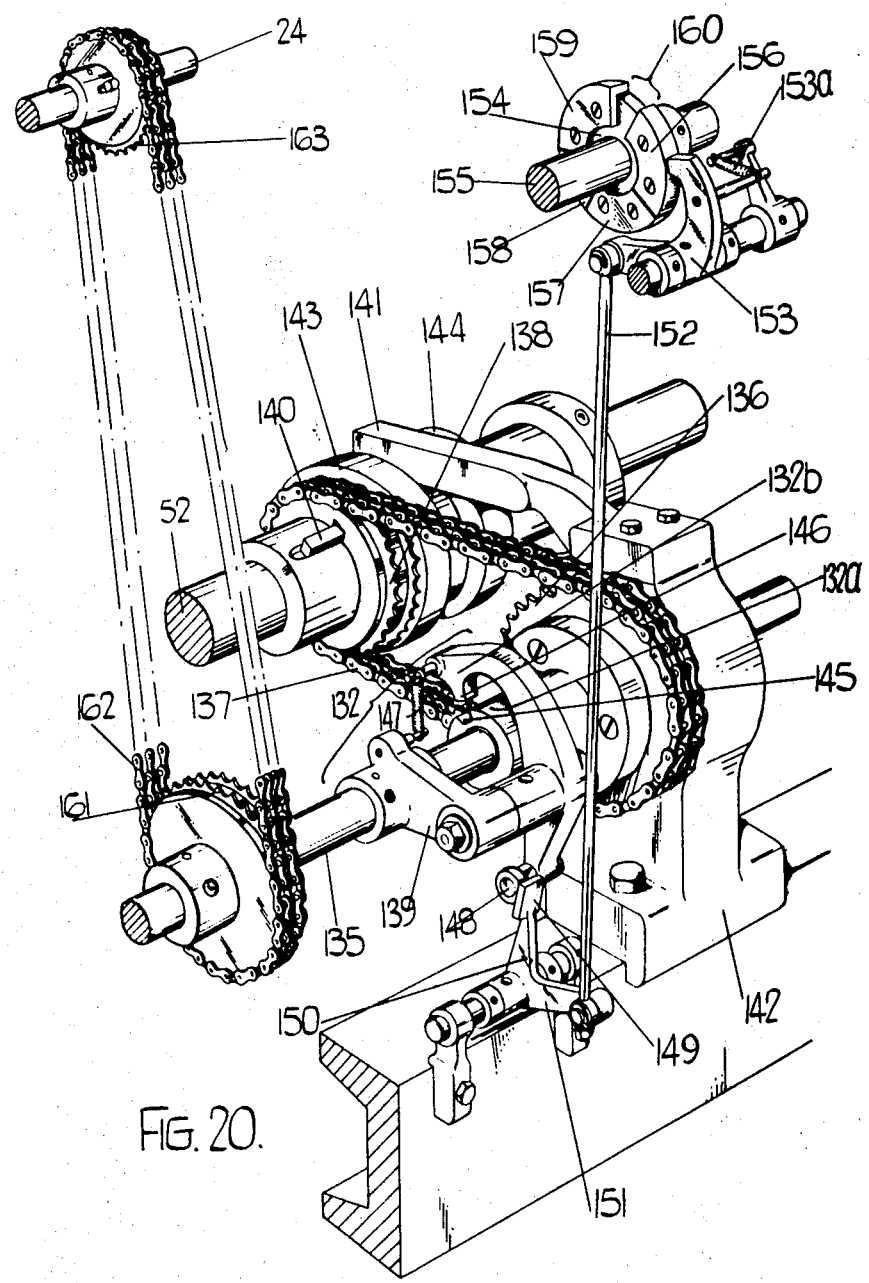
FIG. 20 is a perspective view of clutch control mechanism in the machine.

For the purpose of operating all the magazine transfer units 12 simultaneously, the cam shaft 24, FIG. 3, extends throughout all the knitting sections to provide a common drive for all the units. For operation of the shaft 24, FIGS. 1 and 20, it is driven from the machine's main cam shaft 52 through the intermediary of a revolution clutch 132, and for operation of the clutch at the required cyclic times, the clutch is under control of a disc cam 154 on the machine's top disc control shaft 155. Conveniently the clutch is of a two-part construction, one part 132a of which is a sleeve freely mounted on a shaft 135 and secured to a sprocket wheel 136 which is connected by a driving chain 137 to a sprocket wheel 138 on the machine's main cam shaft 52, and a second part 132b which is a lever pivoted on a bracket 139 secured to the shaft 135. The sprocket wheel 138 has a sliding key connection 140 with the main cam shaft 52 and the sprocket wheel is held from axial movement by an arm 141 which is secured to a bracket 142 which supports the shaft 135 and projects between a pair of collars 143, 144 secured to the sprocket wheel 138 whereby the sprocket wheel 138 is held axially stationary while allowing for usual shogging of the main cam shaft 52. The clutch part 132a has a recess 145 and the clutch part 132b has a projection 146 for co-operation with the recess 145. The clutch part 132b is biased by a spring 147 towards the clutch part 132a but it is normally held clear thereof by a roller 148 on the clutch part 132b abutting against one arm 149 of a bell crank lever 150 the other arm 151 of which is connected by a link 152 to a control lever 153 co-operating with a control disc 154 on the top disc control shaft 155, the control lever 153 normally engaging a cam bit 156 on the control disc 154 and which together with similar cam bits 157, 158, 159 occupies the major part of the circumference of the control disc 154 there being at one location a gap 160 without a cam bit. The shaft 135 has on it a sprocket wheel 161 which is connected by a driving chain 162 to a sprocket wheel 163 on the aforesaid top cam shaft 24. In operation of this mechanism the cam shaft 24 will be normally stationary since, with the two clutch parts 132a, 132b being separated, there is no drive connection from the main cam shaft 52 to the shaft 24.

However each time that the gap 160 in the control disc 154 reaches the control lever 153, this lever is turned by its spring 153a thereby to displace the arm 149 of the lever 150 away from the roller 148 such that the clutch part 132b is displaced by its spring 147 to engage its projection 146 with the clutch part 132a. Since the clutch part 132a is being rotated by the main cam shaft 52 a stage will be reached when the projection 146 engages in the recess 145 whereupon the clutch part 132b will be carried round with the clutch part 132a whereby the shaft 135 is rotated and, through the chain 162, rotation is consequently imparted to the shaft 24. At the end of a revolution of the shaft 135 the disc control shaft 155 is racked by usual racking means for a cam bit to again engage the control lever 153 whereby the arm 149 of the lever 150 re-engages the roller 148 and thereby displaces the clutch part 132b to release the projection 146 from the recess 145 so that the drive is broken and the cam shaft 24 is stopped.

The transfer point bar mechanism 10 comprises spaced pusher arms such as 38, FIG. 1, to one end of which is pivotally connected in permanent manner a transfer point bar 39 having the transfer points 11, and the other end of the pusher arms such as 38 is connected by a bell crank lever 40 to a link 41 which is connected to a cam follower lever 42 which through the medium of a cam follower roller 43 is operable by a cam 44. There are also lift arms such as 45 which are engageable under the point bars 39 to which the arms 45 are pivotally connected and the arms 45 are operable through the medium of a bell crank lever 46 connected by a link 47 to a bell crank lever 48 which is connected by a link 49 to a lever 50 which, also through the medium of the cam follower roller 43, is operable by a cam 51, both cams 44 and 51 being on the machine's main cam shaft 52.

This transfer point bar mechanism 10, FIG. 1, is operable by the arms 44, 51 in the manner previously proposed in our U.S. Pat. No. 3,401,539 to engage the points 11 with the needles 1 for transfer of a rib welt RW from the needles 1 to the points 11. Then draw off hooks 53 are partly advanced according to said patent causing the rib welt RW to fold up. Thereafter the transfer point bar mechanism 10 is operated, in a manner to be hereinafter described, to raise the rib welt RW towards the elevated location as shown in FIG. 10.

Figure 10:
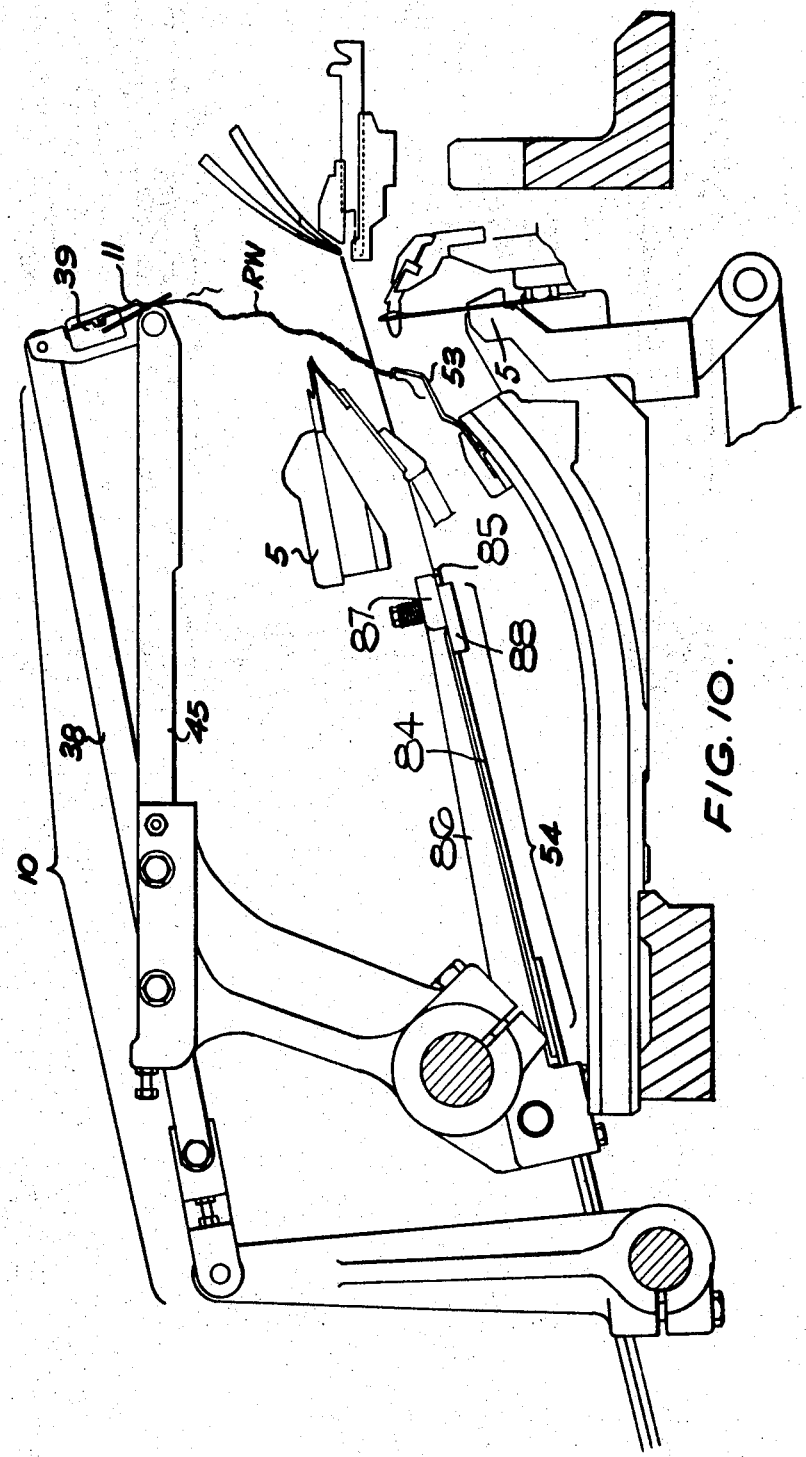
FIG. 10 is an enlarged detail view of part of the machine showing raising of a rib welt by transfer point bar mechanism.

The rib welt RW at the early stages remains connected to the draw off hooks 53, and it will be also apparent, as shown in FIG. 10, that selvedge yarn has been cut and trapped by cutter and trapper mechanism indicated generally at 54 in a manner to be hereinafter particularly described.

It will be further noted that the machine needle bar 5 is, for the stage of FIG. 10, given an auxiliary retracting motion by suitable shaping of its operating cam, in order to provide space for the rib welt RW.

It will be further understood that, since the rib welt RW is, at the stage of FIG. 10, still attached to the draw off hooks 53, it is necessary to stop the upward movement of the transfer point bar mechanism 10 at a predetermined height governed by the length of the welt RW while the welt is unhooked from the draw off hooks 53.

Figure 11:
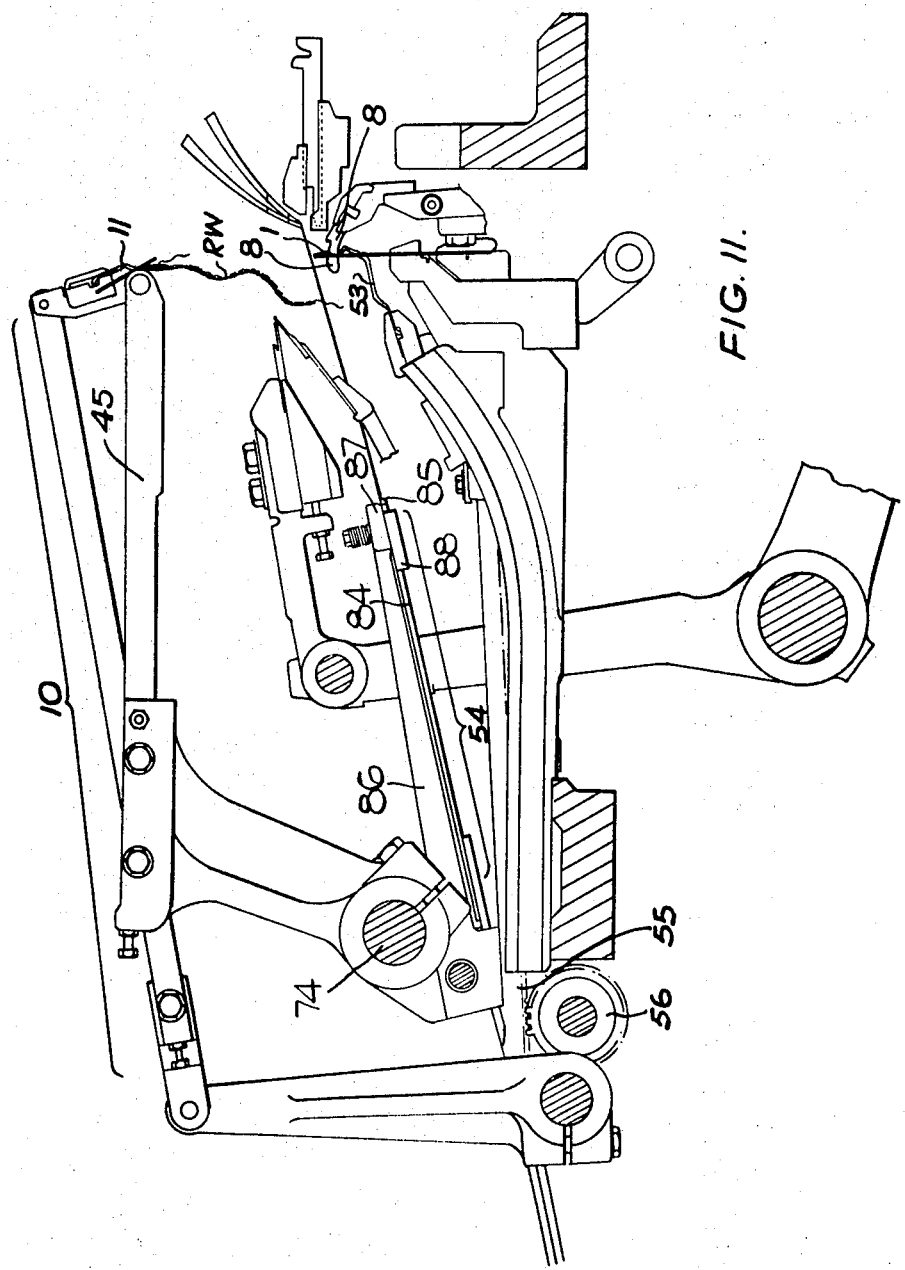
FIG. 11 is a similar view to FIG. 10 showing the rib welt released from draw-off hook bar mechanism.

For the purpose of effecting this unhooking operation, FIG. 11, the draw off hooks 53 have an advance motion imparted to them through the medium of a rack 55 and a pinion 56 by operation of a suitable cam on the machine's main cam shaft. By this means the draw off hook points 53 carry the rib welt into engagement with the knocking over bits 8 such that during the normal upward motion of the knocking over bits 8 they release the rib welt off the draw off hook points 53 so that thereafter the rib welt hangs freely as shown from the points 11.

Figure 12:
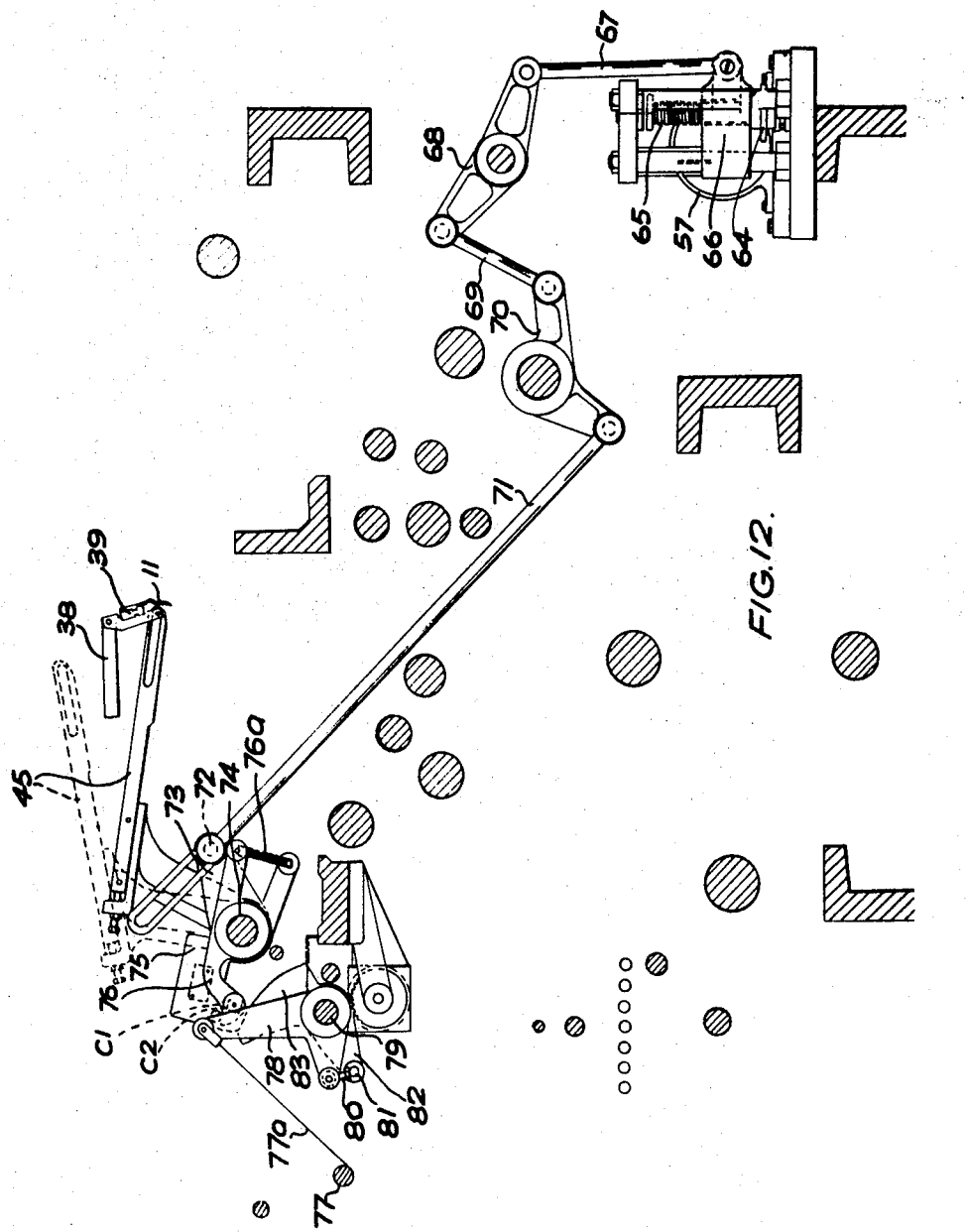
FIG. 12 is a sectional view of part of the machine showing height control means for the transfer point bar mechanism.
Figure 13:
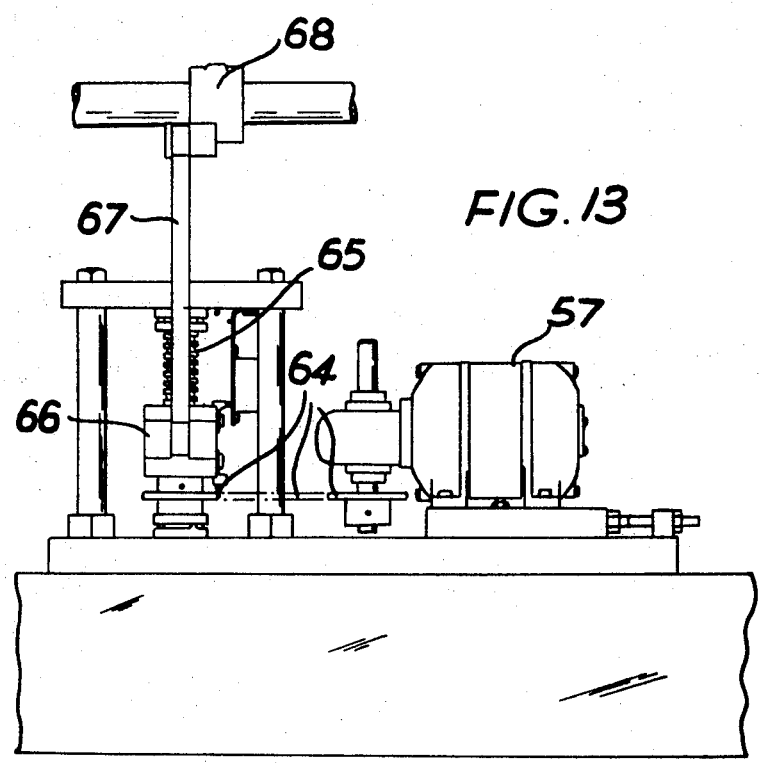
FIG. 13 is a detail rear view of a motor drive part of FIG. 12.
Figure 14:
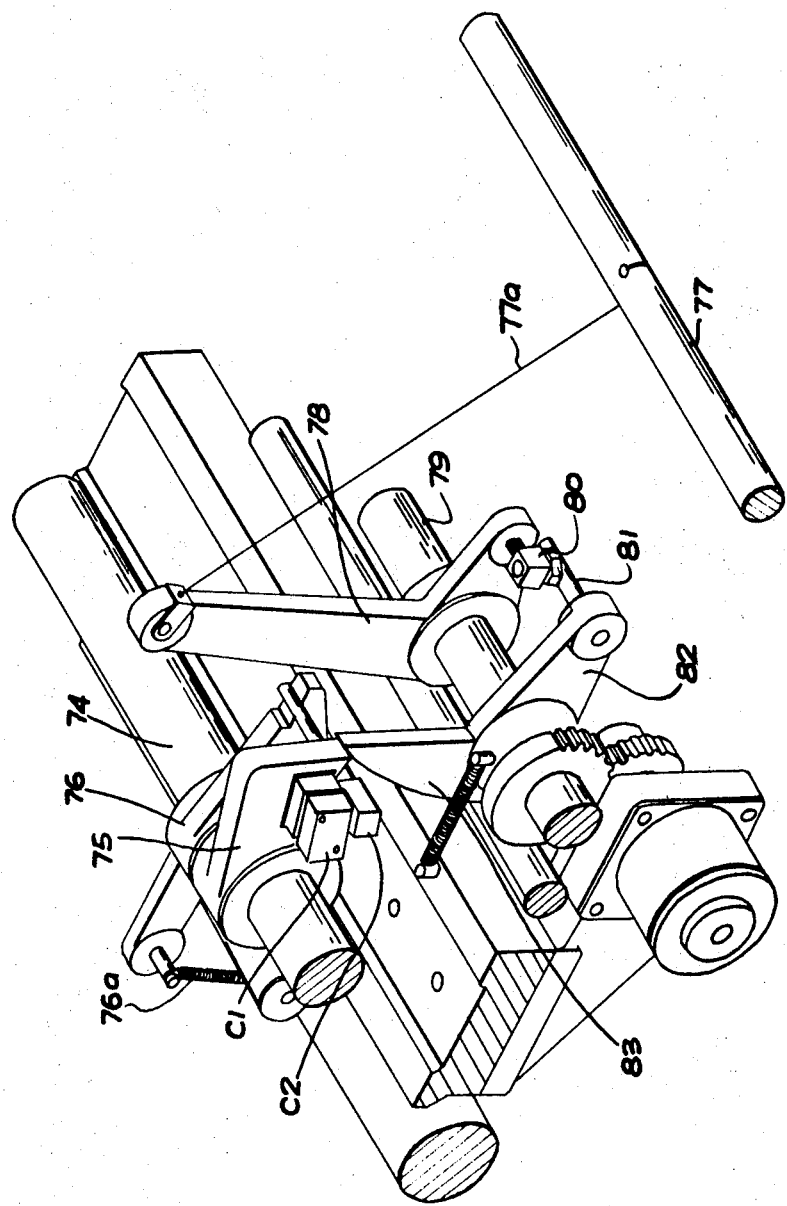
FIG. 14 is a perspective view of part of the height control means.

For the purpose of controlling the motion of the transfer point bar mechanism 10 to allow for this unhooking and other operations, control mechanism for the transfer point bar mechanism 10 is provided indicated in FIGS. 12 to 14.

This control mechanism is driven by an electric motor 57 which is started by operation of an electric switch following operation of an electric switch to stop normal running of the machine so that the early raising of the lift arms 45 by the motor 57 is effected while the machine is non-running.

The motor 57, FIG. 13, drives through chain and sprocket means 64 a lead screw 65 to raise and lower a screw nut 66 which is connected by a link 67 to a lever 68. The lever 68 is connected by a link 69, FIG. 12, to a lever 70, which is connected by a slotted link 71 to a peg 72 on an arm 73 secured to a shaft 74 to which the bell crank 46, of FIG. 1 and connected to the lift arm 45, is also secured. Thus, operation of the motor 57 causes raising of the lift arm 45.

Also on the shaft 74 are two levers 75, 76 which carry contacts C1, C2, see also FIG. 14, respectively of a switch in the motor circuit, and a spring 76a biases the levers into contact engaging positions, the lever 75 being free on the shaft 74.

The fabric draw off shaft 77 is connected by a flexible line 77a to a bell crank lever 78 on a shaft 79 and which has an adjusting screw 80 engaging a peg 81 on a bell crank lever 82, one arm of which is in the form of a graduated cam 83.

As a rib welt is being produced the flexible line 77a is wound about the draw off shaft 77 thereby to pull on the lever 78 and consequently to rotatably displace the graduated cam 83 through a distance proportional to the length of the rib welt. Thus the graduated cam 83 becomes preset spaced from the contact carrying lever 75 which carries the upper contact C1 so that when the lift arm 45 has raised the rib welt to an extent suitable for the length of the welt, the lever 75 has been lowered, as allowed by the shaft 74 lowering the lever 76, sufficient to strike the nearest part of the graduated cam 83 which consequently causes breaking of the contacts C1, C2 to stop the motor 57 and prevent further raising of the lift arm 45 from the position shown in FIG. 10, following which the draw off unhooking operation takes place.

Thereafter the machine is re-started by operation of an electric switch, and a circular part of the machine cam 51 holds the lift arm 45 temporarily stationary.

While the lift arms 45 are thus held, in the position of FIG. 10, the rack and pinion means 55, 56, FIG. 11, are operated as hereinbefore described to advance the draw-off hook bar 53 to the position shown projecting between the frame needles 1, and the knocking over bits 8 thereupon, in their normal upward motion, lift the rib welt RW off the draw-off hooks 53 so that the rib welt then hangs freely from the points 11 as shown.

In order to avoid fouling of the rib welt RW by the draw-off hooks which next retract with a sharp motion, the machine is again stopped, and the lift arms 45 have a preparatory small raising movement imparted to them by re-introduction of the motor 57. Thereafter the motor 57 completes the raising of the lift arms 45.

For cutting and trapping of selvedge yarn prior to the raising of the rib welt RW by the points 11, the cutter and trapped mechanism 54, FIGS. 10, 11 is provided having a relatively movable arm 84, FIGS. 10, 11, 15, 16 with end hook 85, slidable along a relatively stationary arm 86 on the end of which is a clamping member 87 and a cutter 88. The relatively stationary arm 86 projects from a bracket 89, FIGS. 15, 16, having a pair of opposed rollers 90, 91 tightly gripping the shaft 74, and rotatably mounting a pinion 93 which engages a rack 94 from which the relatively movable arm 84 projects.

In operation the arms 84, 86 are operated to be displaced first by axial movement of the shaft 74 from outside the selvedge to inwardly thereof, next back by reverse axial movement of the shaft 74 to the selvedge to search for the yarn by the relatively movable arm which is moved by the rack and pinion 93, 94 to projected position, and finally the relatively movable arm 84 is retracted by the rack and pinion 93, 94 to draw the yarn by the hook 85 into cutting and trapping engagement with the clamping and severing members 87, 88.

The relatively stationary and movable arms 84, 86 are inclined as shown in FIGS. 10, 11, and the advance of the arm 84 is in an inclined direction upwardly and towards the needles. In order to provide space for this movement, and for the initial raising of the rib welt RW by the lift arms 45, on each of these occasions the machine needle bar 5 has imparted to it an auxiliary retracting motion.

For controlled operation of the cutter and trapper mechanism there is a motor operated unit, FIG. 17, which includes an indicator scale and three adjustable stop switches 130, 130a, 130b which can be pre-set at required positions along the scale and which influence the relatively stationary and movable arms 84, 86 for these to operate at different positions for welts of different widths. For this purpose the motor operated unit is driven by motor 101 which has oppositely directed power output spindle 101a, 101b. The output spindle 101a drives through a clutch 102 to a driver gear 103 which transmits drive to a driven gear 107 through idler gears 106 which are free to rotate on a slipper shaft 113a. The driven gear 107 turns a lead screw 108 which is an integral part of a shaft 108a. The drive is then transmitted through a driving sprocket 109 and chain 109a to a sprocket 110. This sprocket 110 is mounted on the clamping and cutting unit control shaft 74 by means of a D bore which mates with a D section part 112 of the shaft 74. This gives the control shaft 74 a rotary motion to advance and return the relatively movable arm 84 of the cutter and trapper mechanism up to and away from the needles. Mounted on the lead screw 108 is a screw nut 113 guided by the slipper shaft 113a. Carried on the nut 113 are two trip cams 114, 114a which operate switches 115, 116 respectively to control the limits of the rotary motion of the shaft 74.

The output spindle 101b drives through a clutch 117 to a driving sprocket 118 which transmits drive through a chain 118a to a driven sprocket 121. This sprocket 121 rotates a lead screw 122 which is an integral part of a shaft 122a. Mounted on the screw 122 is a screw nut 123 which is guided by a slipper shaft 124. The control shaft 74 extends through part of the screw nut 123 and as the latter traverses along the screw 122, it gives a linear motion to the shaft 74 by means of drive collars 125 fixed on the shaft on either side of and adjacent to the screw nut 123. A trip nose 126 is fixed to the screw nut 123 and this nose 126 operates cam arms 127, 127a, 127b which rock shafts 128, 128a, 128b respectively and these in turn actuate arms 129, 129a, 129b to operate switches 130, 130a, 130b. These switches control the outer stop positions of the linear travel of the shaft 74 and consequently of the cutter and trapper mechanism at the correct selvedge settings for sequential knitting of back, front and sleeve rib welts of varying widths. The inside stop position is a constant and is controlled by the nose 126 operating a switch 131. Each output spindle 101a, 101b has a control brake 119, 104 to give instantaneous stopping. The brake 119 operates in conjunction with a clutch 117, while the brake 104 operates with a clutch 102. Each output spindle 101a, 101b has an associated end thrust unit 105, 120 respectively.

An electrical circuit for control of the cutter and trapper mechanism is shown briefly in FIG. 18. The function is carried out by a forward and a reverse three phase contactor. At the commencement of the sequence the motor 101 is started from a time switch (not shown) and the forward contactor is made. The two clutches 102, 117 are made and both linear and rotary motion take place. On reaching the inner limit of the linear travel a switch 131 is pressed and breaks the circuit, thereby de-energizing a relay LTR which changes contacts LTRC and energizes the linear travel brake 119. The rotary motion continues until the top limit is reached whereupon the limit switch 115 is pressed which causing energizing of relay RTR for switch RTRC to change over which breaks circuit to rotary motion clutch 102 and makes circuit to the brake 104. Mounted underneath the switch 115 is another switch SWB, both switches being operated by the same actuator 114, and the switch SWB operates to change the direction of the motor 101, in this instance to energize the reverse contacts RC. This closes auxiliary contactor AC which completes the circuit to the relay LTR through relays SKRS/B, SKRB/B or SKRF/B and switch 130, 130a, or 130b change over. Upon reaching the selected outer limits for linear motion (according to width required) the switch 130, 130a, or 130b is pressed to change back which de-energizes the relay LTR, and contacts LTRC of this relay change over to cause operation of the linear travel brake 119. The changing back of the switch 130, 130a, or 130b causing energizing of the relay RTR through the switch 116, and this relay changes contacts RTRC to energize the rotary clutch 102, whereupon the rotary motion is started up in the reverse direction i.e. away from the head. When the outer limit of the rotary motion is reached the limit switch 116 opens to de-energize the relay RTR to change contacts RTRC and disconnect the rotary clutch 102 and energize the brake 104 thereby completing the cycle. The brakes 104, 119, are retained on and the current to the motor 101 is cut off by a relay not shown.

Figure 19:
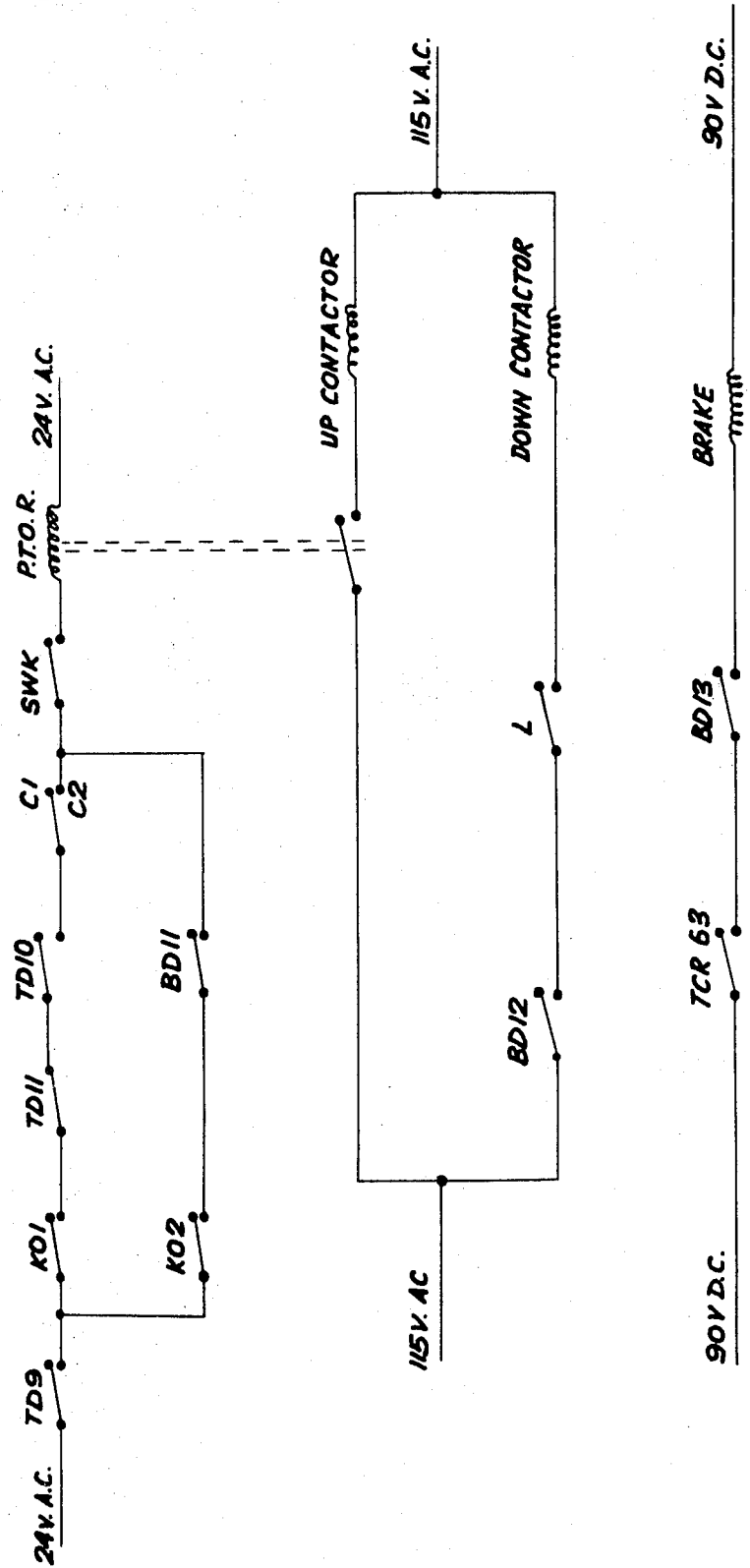

An electric circuit for controlling the machine drive and the arm-raising motor 57 is shown in FIG. 19. A switch TD9 is pressed by a disc cam when the top disc shaft is racked to a required station to prepare for the machine being stopped in the knock-over position by means of a switch KO1 being operated from a cam on the main cam shaft. At the top disc station referred to there is a further switch TD10 which is closed and controls power to the motor 57. This cannot become effective however until the knock-over switch KO1 has been pressed. The motor 57 then raises the lift arms 45 to a predetermined height which is controlled by the length of rib knitted through control of the graduated cam 83, FIG. 4. When the predetermined height is reached the motor circuit is broken by the control switch contacts C1, C2 for the motor 57 to stop. The control switch contacts C1, C2 also re-start the machine which carries on operating until there is reached a second knock-off (or stop) position at which a switch KO2 is operated by a cam on the main cam shaft to again stop the machine. This switch KO2 is also under control of a switch BD11 operated by a disc cam on the bottom disc shaft such that when both switches KO2 and BD11 are made the circuit to the motor 57 is re-made thus allowing the second step of the power out operation to take place. Upon reaching an upper limit switch SWK this switch is pressed which breaks the circuit of motor 57 and allows the main machine to restart. Upon further racking of the disc shaft a disc cam operates whereby the motor 57 is re-started and reversed by means of a switch allowing the lift arm 45 to return to its lower or stand position. Upon reaching this position a switch is pressed which cuts off the supply to the motor 57.

What we claim is:

1. A straight bar knitting machine comprising the combination of means including needles for producing welts, a plurality of successive elevating transfer means having transfer points, means for operating said elevating transfer means for said transfer points to take each welt in turn from the needles and raise it to an elevated location, a magazine point bar unit at said elevated location and having magazine points and transfer elements, means operative, each time a welt on said transfer points is raised to said elevated location, for operating said transfer elements for transferring the welts in turn to the magazine points, and means for mounting the magazine point bar in the magazine point bar unit in readily removable manner.

2. A straight bar knitting machine according to claim 1 being a multi-section machine having a plurality of knitting sections, means identical with said elevating transfer means and magazine point bar unit in each knitting section, and cam operated mechanism interconnecting all the means for simultaneous operation.

3. A machine according to claim 1 having a revolution clutch for the unit, and a revolution pattern control device for timing said clutch to operate cyclically.

4. A machine according to claim 1 having a tray-like fabric guide device in the unit, and means for operating said tray-like fabric guide device, each time the unit is operated, to guide the welts when on the magazine point bar clear of the transfer point during subsequent movements of the latter.

5. A machine according to claim 1 having switch control means providing for the machine to be non-running for at least one period, independent motor control means operable during said period for raising the transfer point bar mechanism, a fabric draw-off shaft, a graduated control cam operable from the fabric draw-off shaft, and a motor control switch, for the purpose of controlled raising of the transfer point mechanism during this period to an extent which is predetermined in relation to the length of the welt.

6. A machine according to claim 1 having a welt draw-off hook bar, knocking-over bits associated with the needles, and cam operated means operable, when the welt has been taken off the needles by the transfer points, for advancing the draw off hook bar into co-operation with the knocking over bits so that in an upward movement of the latter they release the welt from the hook bar.

7. A machine according to claim 1 having draw-off hooks, means for releasing the welt from the draw-off hooks, an independent motor control for said elevating transfer means, and means for operating the independent motor control for a period causing the transfer points to raise the welts clear of the draw-off hooks during retraction of the latter.

8. A machine according to claim 1 having a yarn trapper and cutter mechanism comprising relatively stationary and movable arms which incline upwardly to the needles, motor operated means including a shaft, clutches and brakes for operating the relatively stationary and movable arms first for axial movement of the shaft to move the relatively stationary and movable arms inwardly of the selvedge and then outwardly towards the selvedge to search for the yarn, then for rotation of the shaft to advance and retract the movable arm, and adjustable switch control indicator means for influencing the cutter and trapper mechanism to operate at different positions for welts of different widths.

9. A machine according to claim 1 having a machine needle bar, knockover bits associated with the needles, and means for operating the machine needle bar with an auxiliary retracting motion on two occasions, one to provide space for the welts to be transferred from the needles to the transfer point bar and for the latter to raise the welts, and another to provide space for trapper and cutter arms to be advanced to the knocking over bits.

10. A machine according to claim 1 having frame and machine needles, and means for transferring machine needle loops of the last course of each welt to the frame needles prior to transfer of the welts to the transfer points.

11. A straight bar knitting machine comprising a plurality of knitting sections, means including needles for knitting rib welts in succession in each knitting section, fabric draw-off means for drawing off the welts, means for severing supply yarn at the end of knitting each welt, elevating transfer means for taking the welts from the needles, means for releasing the welts from the fabric draw-off means, means for operating said elevating transfer means including for raising the welts to an elevated location, and at said elevated location in each knitting section a magazine unit comprising removable magazine bar, and means for simulteously operating the magazine units for transferring a plurality of welts from the elevating transfer means to the magazine bars.

12. A straight bar knitting machine having fabric draw-off mechanism, machine needles and frame needles, means for transferring fabric loops from the machine to the frame needles, fabric transfer mechanism comprising lift and pusher arms and a transfer point bar to receive fabric from the needles and deliver it to an upper location, cutter and trapper mechanism for yarn, and a magazine point bar unit including operational cams and an associated revolution clutch, a removable magazine point bar, transfer elements, cam means for operating said unit for transferring fabric from the transfer point bar to the magazine point bar, a cam operated tray-like fabric guide in said unit, switch control means for independent motor control of the transfer point bar mechanism, and a graduated control cam for controlling raising of the transfer point bar to suit different length fabrics.

References Cited

UNITED STATES PATENTS

| | | | |
|---|---|---|---|
| 2,186,023 | 1/1940 | Howie | 66—148 |
| 3,243,976 | 4/1960 | Matthews | 66—148 |
| 3,349,576 | 10/1967 | Borne | 66—148 |
| 3,401,539 | 9/1968 | Duncan et al. | 66—148 |
| 3,446,042 | 5/1969 | Fontaine | 66—148 |

FOREIGN PATENTS

| | | | |
|---|---|---|---|
| 787,994 | 12/1957 | Great Britain | 66—148 |

RONALD FELDBAUM, Primary Examiner